(No Model.)

M. P. WOODS.
CUFF BUTTON.

No. 415,760. Patented Nov. 26, 1889.

Witnesses:
J. B. McGirr.
C. A. Weed.

Inventor:
Maude P. Woods
By F. C. Somes,
Associate Attorney.

UNITED STATES PATENT OFFICE.

MAUDE P. WOODS, OF LYNN, MASSACHUSETTS.

CUFF-BUTTON.

SPECIFICATION forming part of Letters Patent No. 415,760, dated November 26, 1889.

Application filed July 15, 1889. Serial No. 317,577. (No model.)

*To all whom it may concern:*

Be it known that I, MAUDE P. WOODS, of Lynn, in the county of Essex, State of Massachusetts, have invented a certain new and useful Improvement in Cuff-Buttons, of which the following is a description sufficiently full, clear, and exact to enable any person skilled in the art or science to which said invention appertains to make and use the same, reference being had to the accompanying drawings, forming part of this specification, in which—

Figure 1:
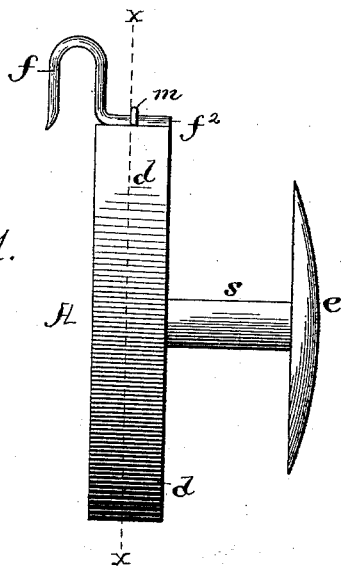
Figure 2:
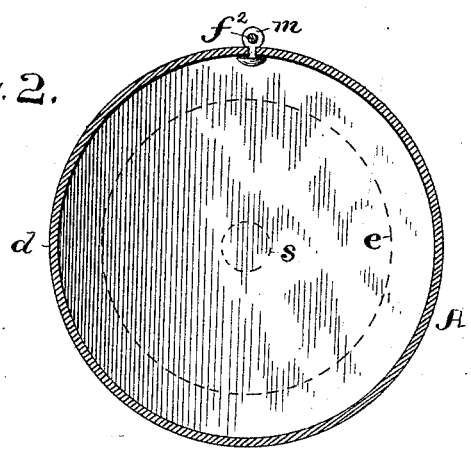

Figure 1 is a side elevation of a cuff-button provided with my improvement. Fig. 2 is a horizontal section on line $xx$ of Fig. 1.

Like letters of reference indicate corresponding parts in the different figures of the drawings.

My invention relates to cuff-buttons particularly designed for use by ladies; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation.

By the use of this improved cuff-button the hook thereof can be made to engage the dress-sleeve from either the inside or outside thereof without injuring the sleeve.

In the drawings, A represents the cuff-button, which is of the ordinary form and construction, comprising a head $d$ and a foot $e$, connected by a shank $s$. The head $b$ is provided with a hook $f$ for engaging the sleeve of the dress. This hook comprises a U-shaped body $f'$ and a shank $f^2$ at right angles to said body. A swivel-eye $m$ is set in a hole in the flange or periphery of the head, and the shank of the hook is passed through said eye. This construction renders the hook reversible without the detachment thereof from the head, as it may be turned with its swivel-eye so that the hook proper projects over the outer face of the head, as shown in the drawings, or it may be reversed so that the pointed end of the hook projects below the lower face of the head. The hook may thus be adjusted with facility for engaging the dress-sleeve from either the outer or inner side thereof, as the wearer may desire.

I claim—

A cuff-button comprising a head, a foot, and a connecting-shank, said head being provided with a swivel-eye disposed in the periphery thereof, and with a hook having a U-shaped body and a shank at right angles thereto secured through said swivel-eye, substantially as described.

MAUDE P. WOODS.

Witnesses:
C. F. MOULTON,
HANNAH SYMONDS.